(12) United States Patent
Yasue

(10) Patent No.: US 6,852,407 B2
(45) Date of Patent: Feb. 8, 2005

(54) POLYOLEFIN-BASED SHEET, DISPLAY SHEET COMPRISING THE SAME, PACKAGE SHEET, TRANSPARENT RECORDING SHEET, COSMETIC SHEET, EMBLEM SHEET, DECORATIVE SHEET, AND COATING MATERIAL FOR POLYOLEFIN RESIN FOR USE IN THESE

(75) Inventor: Takaharu Yasue, Chiba (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 31 days.

(21) Appl. No.: 10/239,200

(22) PCT Filed: Mar. 29, 2001

(86) PCT No.: PCT/JP01/02611
§ 371 (c)(1),
(2), (4) Date: Sep. 27, 2002

(87) PCT Pub. No.: WO01/74931
PCT Pub. Date: Oct. 11, 2001

(65) Prior Publication Data
US 2003/0118809 A1 Jun. 26, 2003

(30) Foreign Application Priority Data

Mar. 30, 2000 (JP) .......................... 2000-093746
Mar. 30, 2000 (JP) .......................... 2000-093747
Oct. 2, 2000 (JP) .......................... 2000-302955

(51) Int. Cl.$^7$ .................. B32B 27/30; B32B 27/32; C08J 7/04; C09D 133/02; C09D 179/02
(52) U.S. Cl. .................. 428/336; 428/341; 428/520; 428/522; 524/514; 524/911; 524/913; 525/185; 525/329.9
(58) Field of Search ................. 428/336, 341, 428/520, 522; 524/514, 911; 525/185, 329.9

(56) References Cited

U.S. PATENT DOCUMENTS

| 4,420,530 A | 12/1983 | Toyoda et al. .............. 428/323 |
| 4,663,216 A | 5/1987 | Toyoda et al. .............. 428/212 |

FOREIGN PATENT DOCUMENTS

| EP | 0 737 730 | 10/1996 |
| EP | 834528 | 4/1998 |
| EP | 0 950 698 | 10/1999 |
| JP | 50-156583 | 12/1975 |
| JP | 51-92837 | 8/1976 |
| JP | 55-37338 | 3/1980 |
| JP | 59-102919 | 6/1984 |
| JP | 62-253674 | 11/1987 |
| JP | 1-92240 | 4/1989 |
| JP | 6-340755 | 12/1994 |
| JP | 8-245816 | 9/1996 |
| JP | 10-110051 | 4/1998 |
| JP | 11-80653 | 3/1999 |
| JP | 11-293148 | 10/1999 |
| WO | WO 96/22338 | 7/1996 |

OTHER PUBLICATIONS

Patent Abstracts of Japan, JP 11–080653, Mar. 26, 1999.
Patent Abstracts of Japan, JP 6–340755, Dec. 13, 1994.
Patent Abstracts of Japan, JP 59–102919, Jun. 14, 1984.
Japanese Unexamined Patent Gazette for JP 51–92837, 1976.
Japanese Unexamined Patent Gazette for JP 50–156583, 1975.
Patent Abstracts of Japan, JP 11–293148, Oct. 26, 1999.
Patent Abstracts of Japan, JP 8–245816, Sep. 24, 1996.
Patent Abstracts of Japan, JP 1–092240, Apr. 11, 1989.
Patent Abstracts of Japan, JP 62–253674, Nov. 5, 1987.
Japanese Unexamined Patent Gazette for JP 55–37338, 1980.

*Primary Examiner*—D. S. Nakarani
(74) *Attorney, Agent, or Firm*—Oblon, Spivak, McClelland, Maier & Neustadt, P.C.

(57) ABSTRACT

A polyolefin-based sheet having a coating layer, which improves printability and does not impair adhesion, wherein the coating layer is one formed from a coating material comprising a water-soluble acrylic resin and polyalkylenimine.

33 Claims, 4 Drawing Sheets

POLYOLEFIN-BASED SHEET, DISPLAY
SHEET COMPRISING THE SAME,
PACKAGE SHEET, TRANSPARENT
RECORDING SHEET, COSMETIC SHEET,
EMBLEM SHEET, DECORATIVE SHEET,
AND COATING MATERIAL FOR
POLYOLEFIN RESIN FOR USE IN THESE

TECHNICAL FIELD

The present invention relates to a polyolefin-based sheet, display sheet comprising the same, package sheet, transparent recording sheet, cosmetic sheet, emblem sheet, decorative sheet, and coating material for polyolefin resin for use in these.

BACKGROUND ART

Recently, in the production of plastic sheets including package materials, polyolefin-based substrate sheets (PO sheets) are increasingly used because of their being compatible with environment. However, in order for a given material to serve as a useful package material, it is often required that it is also amenable to secondary processing: particularly it must be easily printable and adhesive.

To meet the above requirement, that is, to improve the ease with which the PO sheet is amenable to secondary processing, a process is introduced to modify the surface condition of the PO sheet: the sheet is subjected to an oxidization treatment based on corona discharge, or a coating material comprising polyethylenimine and a resin emulsion is applied to the sheet.

However, the treatment based on corona discharge poses a problem: its effect fades over time.

Applying a coating material to a PO sheet is introduced with an intention to improve the printability of the sheet. However, because the PO sheet is inherently low in printability, the above treatment cannot bring about a notable effect as expected. In addition, the cationic activity inherent to polyethylenimine may impair the adhesive activity of a cyanoacrylate adhesive agent usually used in the secondary processing.

Under these situations, there is a need for a PO sheet, which is easily amenable to printing and bonding.

In the production of package materials, preparation of sheets consists of forming a hologram layer on a substrate sheet such as a PO sheet via metal vapor deposition, to enhance the ornamental effect of the sheet.

More specifically, forming a hologram layer on a substrate sheet consists of (1) preparing a metal film on a transfer material composed of PET or the like; (2) applying, under pressure, the transfer material to a substrate sheet via an adhesive layer by pressing a roller carrying the transfer material whose surface has a relief pattern against the substrate sheet; and (3) obtaining the substrate sheet having the metal film transferred and bonded thereupon with the film having the relief pattern printed.

The hologram layer will have its ornamental effect more enhanced, if both of the substrate sheet and the adhesive layer are made light-transmissive (transparent). The preferred adhesive agent for bonding a metal film to a PO sheet may include urethane-based agents or acrylic agents.

However, if a urethane-based adhesive agent is used in this process, although the adhesion is secured, the resulting product will have a limited ornamental effect, because the adhesive is not colorless nor transparent, On the other hand, if an acrylic adhesive agent is used in this process, the product will pose a different problem: the ornamental layer will be easily torn off because of its inadequate adhesion to the PO sheet, although the product will have a sufficient transparency. This is problematic in practice.

One object of the present invention is to provide a coating material useful for polyolefin-based sheets, which will improve the printability of the sheet, and not interfere with its adhesive activity, and also to provide display sheets, package sheets, transparent recording sheets, costume sheets, and emblem sheets based on the use of such coated polyolefin-based sheets.

Another object of the present invention is to provide a polyolefin-based sheet, which is suitably processed into a sheet having a metal-containing ornamental layer thereupon in which adhesion of the ornamental layer to the sheet is secured while the sheet assembly being kept transparent, and also to provide ornamental sheets based on the use of such polyolefin-based sheets.

DISCLOSURE OF THE INVENTION

A polyolefin-based sheet according to this invention is characterized by that the sheet has a coating layer made of a coating material comprising a water-soluble acrylic resin and polyalkylenimine.

The usable polyolefin resin constituting the PO sheet includes homopolymers and copolymers of various olefins, and their mixtures. The usable monomer for homopolymers includes ethylene, propylene, 1-buthane, isoprene, butadiene, etc. The usable copolymer includes ethylene-α-olefin copolymers, ethylene-cyclic olefin copolymers, propylene-α-olefin copolymers, ethylene-vinyl acetate copolymers, ethylene-acrylic acid ester copolymers, etc. Of the PO sheets composed of such various PO resins, the preferred one includes polypropylene-based sheets because of their transparency, mechanical strength, etc.

The method by which to prepare a sheet from such a resin may include any known method such as T-die extrusion, calendering, casting, or the like. The PO sheet may consist of a single layer or of multiple layers. The method for producing multi-layered sheets may include various lamination methods such as co-extrusion, thermal lamination, etc.

The sheet may have both surfaces coated or either of them coated.

The water-soluble acrylic resin according to this invention may include polymers comprising various unsaturated carboxylic acids, and their derivatives. The usable unsaturated carboxylic acid and its derivatives may include acrylic acid, alkyl acrylate, methacrylic acid, alkyl methacrylate, itaconic acid, maleic acid, fumaric acid, etc.

The usable polyalkylenimine may include polyethylenimine, polypropylenimine, etc. Of them, polyethylenimine is particularly preferred. The usable polyethylenimine polymer may include homopolymers of ethylenimine, its modified polymers, and its graft copolymers.

The PO sheet according to this invention may include a coating film having a relatively small thickness.

According to the present invention, because the coating material includes a water-soluble acrylic resin containing a polymer of an unsaturated carboxylic acid in addition to polyalkylenimine, the coated PO sheet will be improved in its printability and maintain its secure adhesiveness.

Because the sheet is improved in printability on account of the coat containing polyalkylenimine, it is possible to print the sheet assembly using common ink.

If the coating material comprised only polyalkylenimine, the coating fluid would be so viscous that, even when it is applied, it would not give a uniform film but cause blocking. When a water-soluble acrylic resin is added to the above coating material, polyalkylenimine is cross-bridged via ionic bond with the carboxyl group of the acrylic resin, and thus a strong coating film is formed from the resulting coating material. Moreover, if the coating material comprises polyalkylenimine and a water-soluble acrylic resin, it is possible to control the content of polyalkylenimine in a coating film by adjusting the coating amount as appropriate, so that the impaired adhesiveness of a cyanoacrylate adhesive agent, which would be otherwise encountered as a result of coexistent polyalkylenimine, can be effectively avoided.

Besides, if another sheet is laid over the coating layer of a PO sheet, the resulting laminated structure will be improved in its mechanical strength.

The coating layer preferably has a thickness of 0.003 to 0.1 $\mu$m, and the preferred blending ratio of the water soluble alkyl resin and polyalkylenimine is in the range of 5:1 to 1:4.

If the coating layer had a thickness of less than 0.003 $\mu$m, the advantage obtainable from the coating would be negligible. On the other hand, if the coating layer had a thickness of more than 0.1 $\mu$m, polyalkylenimine would be present in such an excess amount that it would interfere with the adhesive activity of cyanoacrylate.

If the blending ratio of polyalkylenimine against the water soluble alkyl resin were less than 5:1, the resulting coat would not have sufficient adhesion to the PO sheet. On the other hand, if the blending ratio in question were more than 1:4, the resulting coating would easily cause blocking when the PO sheets are overlaid to each other.

The coating amount (density) of polyalkylenimine is preferably in the range of 0.0005 to 0.1 $g/m^2$, or more preferably 0.0007 to 0.07 $g/m^2$.

The coating amount here is based on the dry weight of coated polyalkylenimine, that is, the content of solid polyalkylenimine in an emulsion when, for example, a coating material containing polyalkylenimine exists as an emulsion.

If the coating amount were less than 0.0005 $g/m^2$, the PO sheet with such a coat would have degraded printability, and lowered adhesion when put into contact with an acrylic adhesive agent. On the other hand, if the coating amount were more than 0.1 $g/m^2$, the resulting coat would have lowered adhesion to a cyanoacrylate adhesive agent, and the PO sheets with such a coat would easily develop blocking when overlaid to each other.

The coating layer preferably contains an antistatic agent: the content of the antistatic agent is preferably in the range of 0.5 to 30 wt %, or more preferably 2 to 15 wt % with respect to the overall weight of solid components of the coating material.

The usable antistatic agent may include any arbitrarily chosen antistatic agent such as surfactants (anionic, cationic, non-ionic and ampholytic), inorganic salts, polyatomic alcohols, metal compounds, and carbon, but the preferred one includes anionic surfactants such as sodium sulfonate.

When an antistatic agent is added to the coating material, the resulting coat will be able to prevent static electricity from accumulating on its surface, and thus blocking due to the development of static electricity will be safely prevented. Moreover, addition of an antistatic agent to the coating material will effectively lessen the amount of an antistatic agent to be added to the PO sheet material which would be otherwise required, thereby avoiding the bleed-out of that agent which would otherwise result if the sheet containing an otherwise required amount of antistatic agent were exposed to high temperatures, that is, the bleed-out which would degrade the appearance of the sheet and its amenability to processing will be effectively avoided.

The coating material preferably contains a natural organic material fine powder and/or a ultraviolet (UV) ray absorbing agent.

The usable powdery natural organic material may include collagen in fine powder; silk fibroin in fine powder; cellulose in fine powder; sericine, chitin or chitosan in fine powder; wool in fine powder; linen, cotton or sponge in powder; egg-white; whey; casein; serum protein; gelatin; etc. The solubilized substance from them may be also used.

The usable UV absorbing agent may include an emulsion obtained by suspending a copolymer of a benzotriazole-based UV absorbing agent and acryl in a medium.

When such a natural organic material fine powder is added to the coating material, the resulting coat will be improved in its surface smoothness. When such a UV absorbing agent is added to the coating material, the resulting coat will prevent the transmission of UV rays through it, and thus the degradation of the underlying PO sheet which would otherwise brought about by transmitted UV rays, and the degradation of an article wrapped with the PO sheet if the PO sheet serves as a package material would be safely avoided.

The polyolefin-based sheet described above is highly transparent, easily amenable to printing, and easily amenable to secondary processing including bonding. Moreover, because it is easily provided with functions such as antistatic activity, UV ray absorbing activity, etc., it is suitably used as display sheets, various package sheets, transparent recording sheets, cosmetic sheets, emblem sheets, etc.

Further, the polyolefin-based sheet described above may be used as ornamental sheets.

The aforementioned polyolefin-based sheet preferably comprises a polyolefin-based substrate sheet having a metal-containing ornamental layer formed at least on one of its surfaces wherein a coating layer is formed on the surface upon which the ornamental layer will be formed, and wherein the coating layer is preferably made from a coating material comprising a water-soluble acrylic resin comprising a polymer of an unsaturated carboxylic acid, and polyalkylenimine.

The polyolefin-based resin constituting the substrate sheet is as described above, but preferably includes polypropylene-based sheets whose transparency has been enhanced. Specifically, most preferred are the polypropylene-based sheets whose total haze (overall opacity) is 10% or less when measured by a method based on JIS K7105.

The unsaturated carboxylic acid preferably includes acrylic acid and/or methacrylic acid.

The ornamental layer prepared according to the present invention is not limited to any specific one, but may include various ornamental layers based on metal films. However, it is preferably a hologram layer obtained by modifying the surface of a metal film to have a relief pattern.

The method by which to form an ornamental layer may include various ones, for example, a method which consists of forming a metal film on a transfer sheet via sputtering, ion-plating, vapor deposition or the like, and of transferring the metal film onto a substrate sheet. Particularly, the method suitable for forming a hologram layer may include a method which consists of forming a metal film on a transfer material via vapor deposition, and of transferring the metal film to a substrate sheet, or a method which consists of directly forming an ornamental layer on the surface of a coating layer excellent in adhesion via gravure coating.

Transference of a metal film to a substrate sheet may occur by any method chosen as appropriate depending on the property of an adhesive agent to be used in conjunction.

The metal to be used for the ornamental layer preferably includes non-iron metals such as aluminum, magnesium, nickel, and chromium, and their oxides, and their mixtures.

According to the present invention, a coating layer composed of a coating material comprising a water-soluble acrylic resin prepared from a polymer of an unsaturated carboxylic acid, and polyalkylenimine covers the surface of a PO substrate sheet upon which an ornamental layer will be formed. Accordingly, if an ornamental layer is formed on the coating surface of the substrate sheet via an acrylic adhesive agent, adhesion of the ornamental layer to the substrate sheet will be enhanced. Through this arrangement it is possible for the ornamental layer to be securely bonded to the PO sheet even when the acrylic adhesive agent is used for adhesion, which would otherwise have a low adhesive activity towards the PO sheet. In addition, because an acrylic adhesive agent is used for adhesion, the sheet assembly will have a high transparency, and the metallic shade of the ornamental layer will serve as an attractive design feature when the sheet is used as a package material, that is, the sheet will serve as a highly ornamental package material.

The ornamental sheet assembly according to this invention comprises a polyolefin-based substrate sheet having a coating layer composed of a coating material comprising a water-soluble acrylic resin and polyalkylenimine, an acrylic adhesive layer formed on the coating layer, and an ornamental layer formed on the acrylic adhesive layer.

According to the present invention, because the PO substrate sheet has the coating layer containing polyalkylenimine, adhesion of the acrylic adhesive agent to the PO sheet is enhanced, and, as a consequence, adhesion of the ornamental layer to the PO sheet is also enhanced. In addition, because the acrylic adhesive agent is used, the transparency of the ornamental sheet is ensured.

The ornamental layer is not limited to any specific one, but may include various ornamental layers comprising metal films, and is preferably a hologram layer, that is, a metal film with a relief pattern printed thereupon.

The acrylic adhesive agent is not limited in its properties, and may include those with various properties, for example, acrylic adhesive agents capable of solidifying when exposed to UV rays or to heat.

The thickness of the coating layer, and the requirements with regard to the water-soluble acrylic resin, polyalkylenimine, polyolefin-based substrate sheet, and ornamental layer are the same with those given above with respect to the polyolefin-based sheet.

The polyolefin-based substrate sheet preferably includes polypropylene-based sheets.

If the sheet is made from polypropylene, the ornamental sheet applied thereto will entirely have an enhanced strength. If the sheet is enhanced in its transparency, the transparency of the entire ornamental sheet will be also enhanced.

Specifically, most preferred are the sheets whose total haze is 10% or less when measured by a method based on JIS K7105 as described above.

The coating material for the polyolefin-based resin (PO resin) according to this invention includes an water-soluble acrylic resin containing a polymer comprising an unsaturated carboxylic acid, and polyalkylenimine.

The method by which to process an unsaturated carboxylic acid, polyalkylenimine and a polyolefin-based resin into a sheet is the same with that given above with respect to the polyolefin-based sheet.

According to the present invention, because the coating material comprises a water-soluble acrylic resin prepared from a polymer of an unsaturated carboxylic acid, and polyalkylenimine, the resulting sheet will be improved in its printability and protected against the degradation of its bonding activity which would otherwise result.

Namely, because the sheet is improved in its printability on account of its containing polyalkylenimine, it is amenable to printing based on common ink.

If the coating material comprised only polyalkylenimine, the resulting fluid would be so viscous that it would not spread uniformly over the sheet, which would cause blocking. When a water-soluble acrylic resin is added to the coating material, polyalkylenimine is cross-bridged via ionic bond with the carboxyl group of the acrylic resin, and thus a strong coating film is formed. Moreover, if the coating material comprises polyalkylenimine and a water-soluble acrylic resin, it is possible to control the content of polyalkylenimine in a coating layer by adjusting the coating amount as appropriate, so that the impaired adhesiveness of a cyanoacrylate adhesive agent, which would otherwise result due to coexistent polyalkylenimine, can be effectively avoided.

Besides, if another sheet is laid over the coating layer of a polyolefin-based sheet, the resulting laminated structure will be improved in its mechanical strength.

The coating material preferably contains volatile amine as an agent for neutralizing the carboxylic group of the acrylic resin.

The usable volatile amine may include amines having a relatively small molecular weight such as ethanolamine (aminoethanol), ammonia, methylamine, ethylamine, etc.

According to the present invention, because the coating material contains volatile amine as a neutralizing agent, an excess amount of the volatile neutralizer will not remain in the coating layer. Accordingly, it is possible to prevent the degradation of the coating layer, which would result if the neutralizer remained in the coating layer.

Polyalkylenimine preferably has a molecular weight of 200 to 20000.

If polyalkylenimine had a molecular weight more than 20000, its miscibility to the water-soluble acrylic resin would be impaired, and the coating material would have its storage life (pot life) shortened. Moreover, the coating material might develop white precipitate, thereby impairing the transparency of the sheet assembly. The coating material will be free from the above problems, as long as polyalkylenimine has a molecular weight smaller than the above limit. Namely, as long as polyalkylenimine has a molecular weight smaller than the above limit, the coating material will not pose any problem during processing. However, polyalkylenimine preferably has a molecular weight of 200 or higher, when its availability is taken into account. More preferably, polyalkylenimine has a molecular weight of 500 to 5000.

The blending ratio of the water-soluble acrylic resin and polyethylenimine is preferably 5:1 to 1:4.

If the blending ratio of polyalkylenimine against the water soluble alkyl resin were less than 5:1, the resulting coat would not have sufficient adhesion to the PO sheet. On the other hand, if the blending ratio in question were more than 1:4, the sheets having a coating layer prepared from the material would easily develop blocking when overlaid to each other.

The coating material described above preferably contains an antistatic agent, a natural organic material fine powder, and a UV absorbing agent as appropriate. The specific examples of those additives and their addition amounts are as described above with respect to the polyolefin-based sheet.

BEST MODE FOR CARRYING OUT THE INVENTION

The preferred embodiments will be described below with reference to the attached drawings.

First Embodiment

Figure 1:
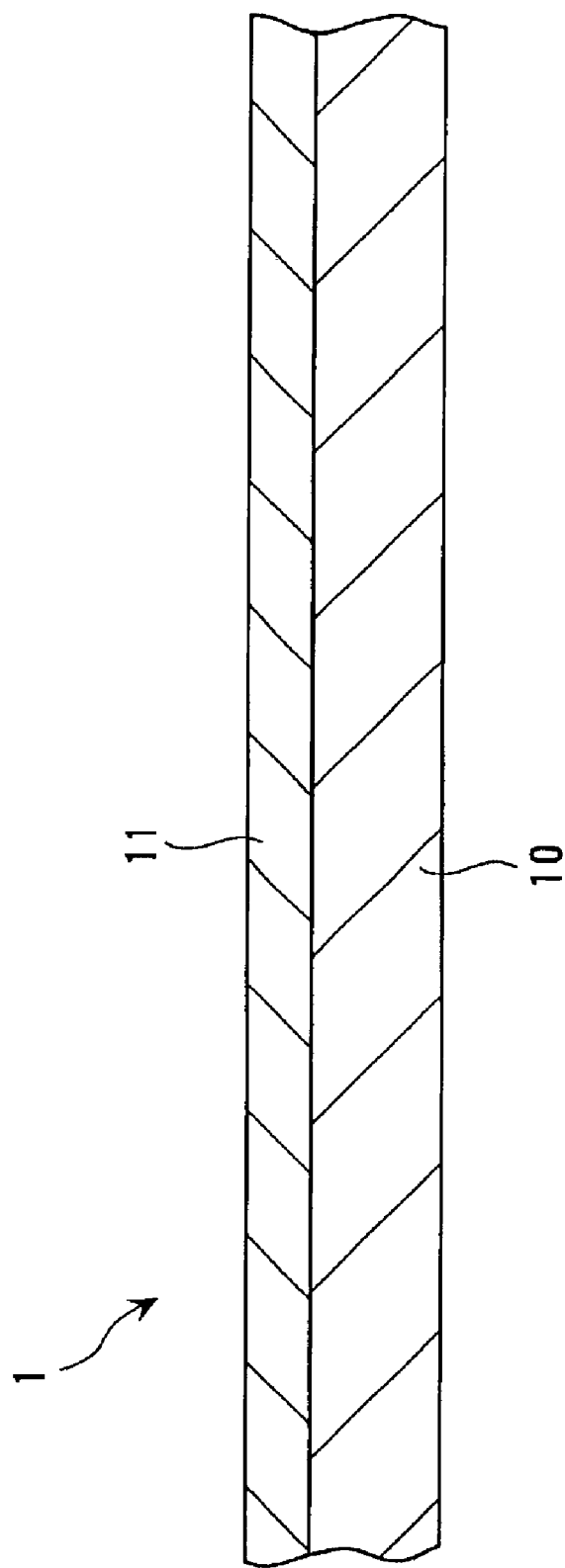
FIG. 1 is a sectional view of a part of a polyolefin-based sheet representing a first embodiment of this invention.

FIG. 1 shows a polyolefin-based sheet 1 (PO sheet hereinafter) representing a first embodiment of this invention.

The PO sheet 1 comprises a substrate sheet 10 made of a transparent polypropylene sheet with a coating layer 11 composed of a coating material comprising a water-soluble acrylic resin and polyalkylenimine formed on a surface upon which an ornamental layer will be formed.

The PO sheet constructed as above is prepared as follows.

A substrate sheet 10 previously processed into a sheet via T-die extrusion has both its surfaces subjected to corona treatment, that is, oxidization treatment.

Then, a coating material which has been obtained by blending a water-soluble acrylic resin mainly composed of a copolymer of acrylic acid and methacrylic acid esters, polyethylenimine having a molecular weight of 1200 and an antistatic agent based on sodium sulfonate at a ratio of 0.125%:0.025%:0.02% (in terms of the respective weights of those solid components with respect to the total weight of the solution or of the coating material) is applied with a gravure coater onto one surface of the substrate sheet 10 at a density of 0.0075 g/m² in terms of dry base (or 5 g/m² in terms of wet base). Later, the yield is kept at 80° C. for 30 seconds to be dried, and a PO sheet 1 having a coating layer 11 formed thereupon is obtained. The coating process may occur in-line or off-line.

In this particular embodiment, the blending ratio of the water-soluble acrylic resin and polyethylenimine is 5:1, and the addition amount of the antistatic agent is 11.7 wt % with respect to the overall weight of solid components of the coating material. The coating density of polyethylenimine (in terms of its solid weight) is 0.0012 g/m². In addition, the coating layer 11 is allowed to have a thickness of 0.0075 $\mu$m.

The coating material further contains a specified amount of 2-aminoethanol as a volatile neutralizing agent.

In this process, the coating layer immediately after its formation has a sufficiently high affinity towards an acrylic adhesive agent to achieve firm adhesion. However, to further enhance adhesion, it is preferred to subject the sheet assembly to maturation.

The coating material may be further supplemented with a natural organic material fine powder and a UV absorbing agent so that it can have smooth surfaces and absorb UV rays.

According to the embodiment as described above, the following advantages will be ensured.

(1) A coating layer 11 composed of a coating material comprising a water-soluble acrylic resin prepared from a polymer of an unsaturated carboxylic acid, and polyalkylenimine covers a surface of a PO substrate sheet 10 upon which an ornamental layer will be formed. Accordingly, even when the ornamental layer must be formed via an acrylic adhesive agent, adhesion of the ornamental layer to the PO sheet 1 will be enhanced. Through this arrangement, it is possible to ensure firm adhesion of the ornamental layer to the PO sheet 1 even when an acrylic adhesive agent is used for adhesion, which would otherwise show a low affinity towards the PO sheet.

(2) Because an acrylic adhesive agent can be used for adhesion, the high transparency of the sheet assembly will be ensured, and thus the metallic shade of the ornamental layer will serve as an attractive design feature when the sheet is used as a package material, that is, the PO sheet 1 will serve as a highly ornamental package material.

(3) Because the coating layer 11 has a thickness of 0.0075 $\mu$m, and the blending ratio of the water-soluble acrylic resin and polyethylenimine is 5:1 (0.125:0.025), the coating layer 11 is highly affinitive to the substrate sheet 10 so that the resulting sheets will rarely develop blocking even when overlaid to each other.

(4) Because the antistatic agent based on sodium sulfonate is added at a concentration of 11.7 wt %, the sheet will be protected against the accumulation of static electricity, and blocking of the resulting sheets due to the development of static electricity which might otherwise result will be safely avoided. Moreover, addition of an antistatic agent to the coating material will effectively lessen the amount of an antistatic agent to be added to the PO sheet material 10 which would be otherwise required, thereby preventing the bleed-out of an excess amount of that agent which would otherwise result if the sheet containing an otherwise required amount of antistatic agent were exposed to high temperatures, that is, the bleed-out which would degrade the appearance of the sheet and its amenability to processing will be effectively avoided.

(5) Because polyethylenimine has a molecular weight of 1200, the resulting coat material will have a long pot life, and the coating layer 11 therefrom will not form any problem including impaired transparency.

(6) Because the neutralizing agent is based on volatile 2-ethanolamine, an excess amount of volatile neutralizing agent if any will not remain in the coating layer 11. Accordingly, it is possible to avoid the degradation of the coating layer, which would result if the neutralizer remained in the coating layer 11.

Second Embodiment

In the following explanation, with regard to the constitutive elements similar to those of the first embodiment, they will be represented by the same symbols, and their explanation simplified or omitted.

Figure 2:
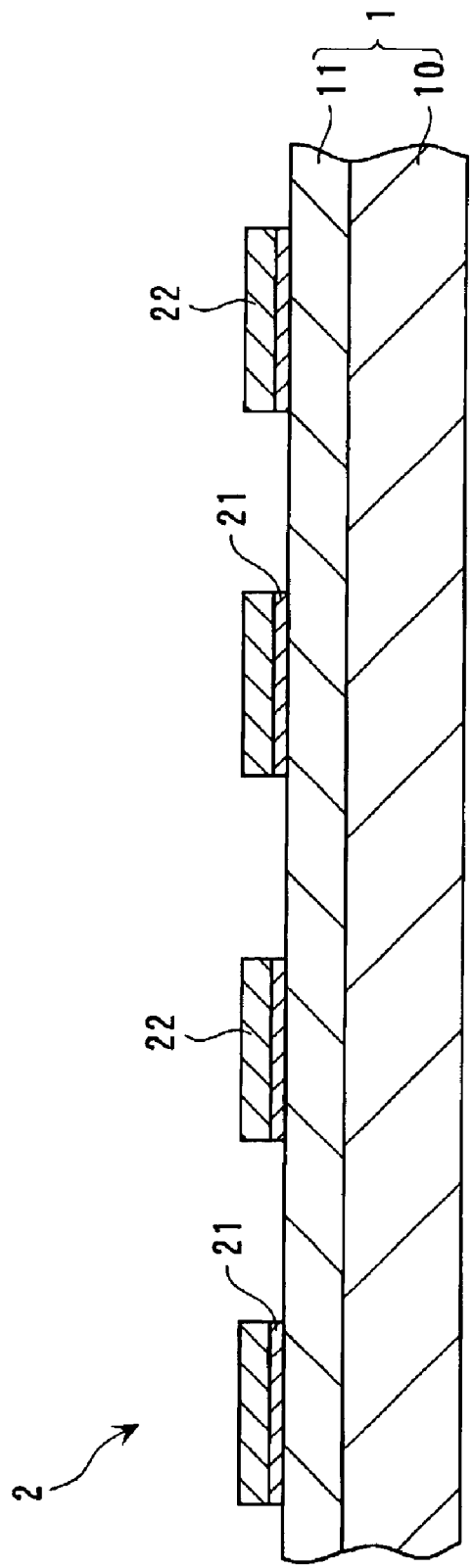
FIG. 2 is a sectional view of a part of an ornamental sheet representing a second embodiment of this invention.

FIG. 2 shows an ornamental sheet 2 representing a second embodiment of this invention.

The ornamental sheet assembly 2 is obtained by laying a hologram layer 22 partly made of a metal film via an adhesive layer 21 of an acrylic adhesive agent over a coating layer 11 formed on a PO sheet 1 as described above.

Figure 3:
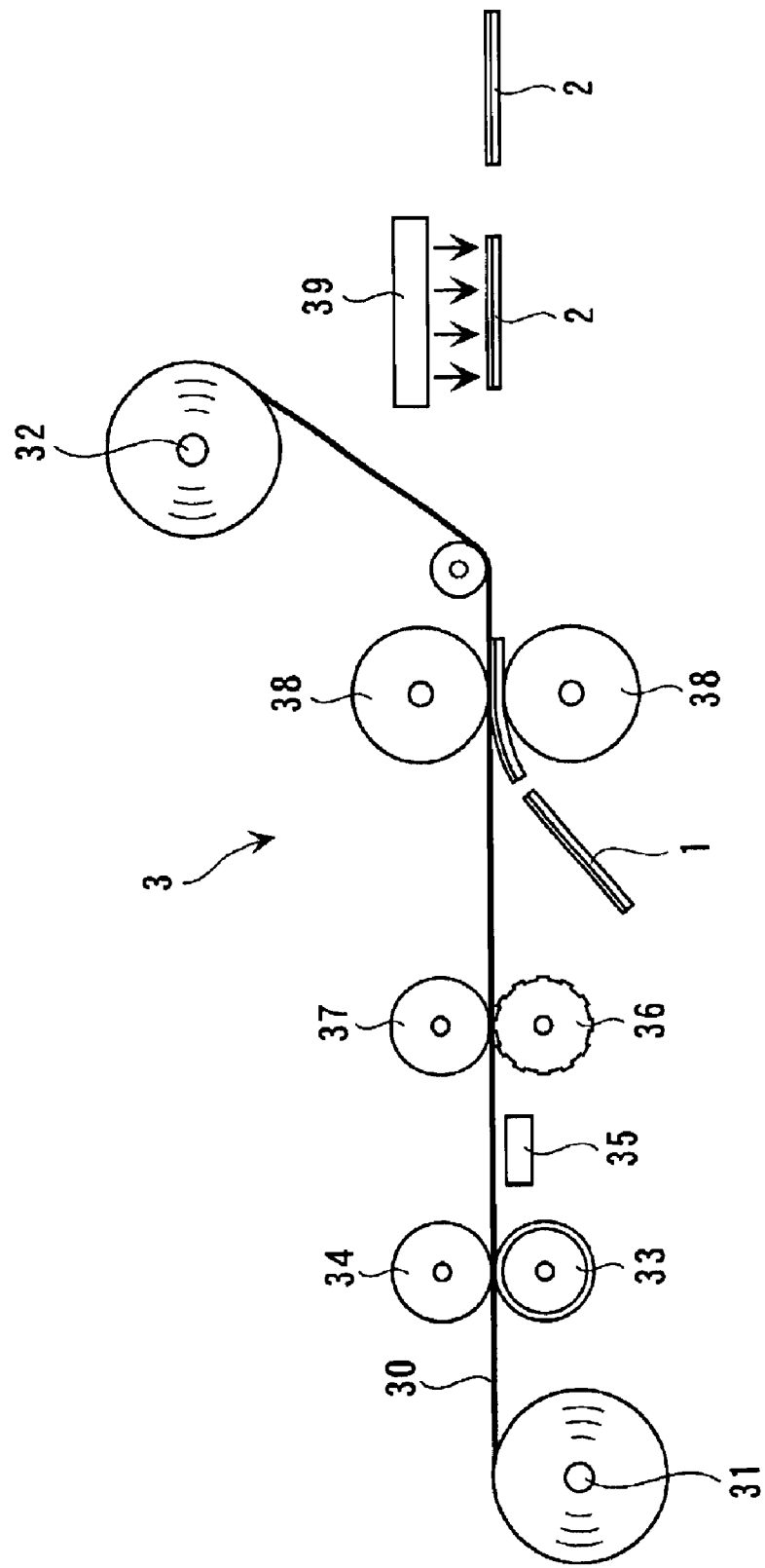
FIG. 3 is a schematic diagram for illustrating the constitution of a first system for producing the ornamental sheet of the embodiment shown in FIG. 2.

Turning now to FIG. 3, a first system for producing the ornamental sheet assembly 2 and a production method based thereon will be described.

FIG. 3 shows the first system 3 for producing an ornamental sheet 2 according to the present invention.

The first production system 3 comprises a feed roll 31 for feeding a polyester sheet 30; a take-up roll 32 for taking up the sheet 30 after the sheet has given out a metal film; a coating roll 33 for coating an adhesive agent and a metal film; a first pressing roll 34 which is placed opposite to the coating roll 33 for pressing the sheet 30 towards the coating roll 33; a drying machine 35 for drying the adhesive agent applied to the sheet 30 by the coating roll 33; an embossed copper roll 36 for printing a relief hologram pattern to the adhesive agent; a second pressing roll 37 which is placed opposite to the printing copper roll 36 for pressing the sheet 30 to the printing copper roll 36; a pair of transfer rolls 38 for transferring the hologram pattern to a PO sheet 1; and a UV radiating unit 39 for completely solidifying the adhesive layer via UV radiation.

The method for producing an ornamental sheet 2 using the first production system 3 configured as above will be described.

Firstly, a roll of polyester sheet 30 is set on the feed roll 31. The sheet 30 fed from the feed roll 31 is introduced into a gap between the coating roll 33 and the pressing roll 34 placed opposite to each other, and here an acrylic adhesive agent capable of solidifying when exposed to UV rays and supplemented with metal flakes are applied to the entire surface of the sheet 30 while the sheet 30 is pressed by the first pressing roll 34 against the coating roll 33.

Then, the sheet 30 having the adhesive agent coated thereupon is carried above the drying device 35 and here the adhesive agent is dried so much as to be ready for receiving the printing of a hologram pattern thereupon.

The sheet 30 having the adhesive agent coated thereupon is then introduced into a gap between the printing copper roll 36 and the second pressing roll 37 which are placed opposite to each other, and a pattern formed on the printing copper roll 36 is printed onto the adhesive layer, and thus an adhesive layer having the hologram pattern printed thereupon is formed on the sheet 30.

In the manner as described above, the sheet 30 carrying the adhesive layer having the hologram pattern printed, and a PO sheet 1 prepared as described above with respect to the first embodiment are fed to the pair of transfer rolls 38, 38 such that the sheet 30 is superimposed over the PO sheet 1, thereby putting the adhesive layer of the sheet 30 in contact with the coating layer of the PO sheet 1. Through this process, the adhesive layer with metal flakes having the hologram pattern printed is transferred to the PO sheet 1 to produce a sheet assembly having a hologram layer formed thereupon.

Finally, the ornamental sheet assembly 2 having the hologram layer formed on the top of it is fed to the UV ray radiating unit 39, so that the acrylic adhesive agent can be completely solidified.

The ornamental sheet assembly 2 thus obtained can be used as a package material for widely varied applications.

Next, a second system for producing an ornamental sheet assembly 2 according to this invention and a production method based thereon will be described with reference to FIG. 4.

In the following description, the same constitutive elements with those of the first production system 3 will be represented by the same symbols, and their explanation omitted or simplified.

Figure 4:
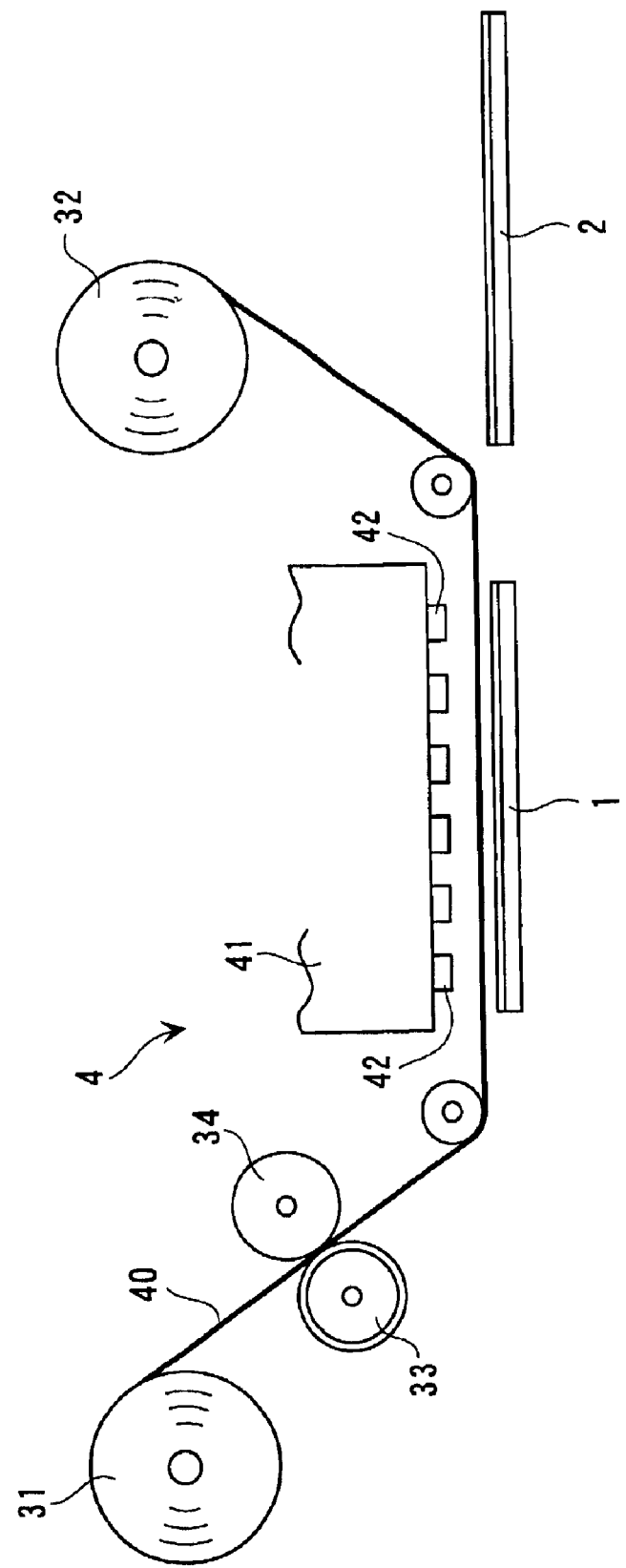
FIG. 4 is a schematic diagram for illustrating the constitution of a second system for producing the ornamental sheet of the embodiment shown in FIG. 2.

FIG. 4 shows the second system 4 for producing an ornamental sheet assembly 2 according to this invention.

The second production system 4 is different from the first one in the following points.

With the first production system, the copper printing roll and the transfer rolls are responsible for the formation of the hologram layer. However, the second production system 4 includes, instead of the copper printing roll, second pressing roll and transfer rolls, a printing surface 42 carrying a hologram pattern and a heating plate 41 which moves up and down, at its terminal end.

The second production system 4 is adapted for transferring a hologram layer using the heating plate 41, and for employing a thermosetting acrylic adhesive agent, and thus can dispense with the use of a UV ray radiating unit.

A sheet assembly 40 is obtained by forming an easily separable layer such as a silicon coat on a polyester substrate sheet, and then by laying a metal film over the sheet via vapor deposition.

The method how to produce an ornamental sheet 2 using the second production system 4 configured as above will be described.

Firstly, an easily separable layer such as a silicon coat is formed in advance on a polyester substrate sheet, and a metal film is formed via vapor deposition on the sheet. A roll of such a sheet assembly 40 is set on a feed roll 31.

The sheet assembly 40 fed from the feed roll 31 is introduced into a gap between a coating roll 33 and a pressing roll 34 which are placed opposite to each other, and here a thermosetting acrylic adhesive agent is coated onto the entire surface of the metal film while the sheet assembly 40 is pressed by the pressing roll 34 against the coating roll 33. The sheet assembly 40 having thus the adhesive agent coated thereupon is carried above a PO sheet 1 placed in advance beneath the heating plate 41. Then, the heating plate 41 lowers and the sheet assembly 40 also descends being forced down by a printing surface 42, so that the sheet assembly 40 is put into contact with the PO sheet 1. The adhesive agent, which has a hologram pattern printed being pressed by the printing surface 42 and hardens in the presence of heat is transferred to the PO sheet 1, to produce an ornamental sheet 2.

According to the second embodiment as described above, in addition to the aforementioned advantages obtained from the first embodiment, the following advantages will be further ensured.

(7) Because the sheet assembly comprises the coating layer 11 containing polyethylenimine on the surface of the PO substrate sheet 10, adhesion of the PO sheet 1 to the adhesive layer 21 comprising an acrylic adhesive agent will be enhanced, and as a result adhesion of the PO sheet 1 to the ornamental layer 22 will be also enhanced. Moreover, because the acrylic adhesive agent is used, the resulting ornamental sheet 2 will be able to maintain its transparency.

It should be noted that the present invention is not limited to any one of the above embodiments, but include any variants and modifications of them, as long as those variants and modifications can satisfy the objects of this invention.

For example, according to the above embodiments, the PO substrate sheet incorporates a polypropylene-based (PP) sheet. However, the substrate sheet is not limited to this one, but may include PO substrate sheets composed of various other polyolefins. The above embodiments depend on T-die extrusion for molding the substrate sheet 10, but the molding method is not limited to this one. The sheet molding can occur by any known method such as calendaring, casting or the like.

The above embodiments employ a water-soluble acrylic resin mainly comprising a copolymer of acrylic acid and methacrylic acid esters. However, the usable water-soluble acrylic resin is not limited to this one, but may include any water-soluble resins comprising polymers of various unsaturated carboxylic acids. The other component of the coating material is not limited to polyethylenimine, but may include polypropylenimine and the like. The blending ratio of the water-soluble acrylic resin and polyethylenimine in the formation of the coating material is not limited to those cited with respect to the above embodiments, but may take any value between 5:1 and 1:4.

According to the above embodiments, the coating density is set at 0.0075 $g/m^2$ in terms of dry base. However, the coating density is not limited to this level, but may take any appropriate value depending on given situations. For example, the coating may occur at 0.01 or 0.005 $g/m^2$ in terms of dry base.

The method and mode of oxidization treatment applied to the substrate sheet 10 are not limited to those employed in the above embodiments: the treatment may be applied to both surfaces of a substrate sheet, or to either of them depending on given situations, or may occur by any other oxidization method than corona discharge, for example, by frame treatment. The usable coater is not limited to a gravure coater, but may include any coaters such as an offset coater. The drying temperature and the drying time can be also set at any desired values, depending on the property of the coating material and the thickness of the coating layer.

The antistatic agent is not limited to one based on sodium sulfonate, but may include any appropriate antistatic agents depending on given situations. The addition amount of the antistatic agent can be set at any desired level between 0.5 and 30 wt %, preferably between 2 and 15 wt %.

In the second embodiment, vapor deposition is employed for depositing a metal film on a polyester-based sheet to produce thereby a sheet assembly 40. However, the method for forming a metal film on a polyester-based sheet is not limited to above, but may include sputtering, ion-plating, etc.

The specific structures and shapes of the instruments and elements required for achieving the above embodiments can be modified and altered in any desired manner as long as the modifications and alterations are in compliance with the achievement of the object of the present invention.

Third Embodiments

This embodiment relates to the production of a package material by employing a polyolefin-based sheet like the substrate sheet of the first embodiment, and by subjecting the sheet to secondary processing such as printing or bonding on one of its surfaces without, in contrast with the first embodiment, forming an ornamental layer on that processed surface. Because the basic composition of the polyolefin-based sheet and the formation of a coating layer prepared from a coating material are the same with those of the first embodiment, and thus their explanation will be omitted.

In this embodiment, the coating layer formed on the surface of the PO sheet presents with improved printability immediately after its formation. However, to enhance the mechanical strength of the coating layer, it is preferred to subject the sheet to maturation.

The PP sheet assembly prepared as above is suitably used for various applications as indicated in the following because of the ease with which the assembly is amenable to printing and bonding.

(1) Display Sheet

"Display sheet" used herein refers to a protective sheet to serve as a printing base of a signboard.

The PP sheet is highly useful when it is employed in display applications: the PP sheet has an improved printability and adhesiveness; the PP sheet is easily provided with antistatic activity; and it is highly strong and transparent.

(2) Package Sheet

The PP sheet is highly useful when it is employed in packaging applications: the PP sheet is excellent in transparency and printability; and it is so affinitive to cyanoacrylate adhesives that it is also amenable to secondary processing.

(3) Transparent Recording Sheet (Film)

"Transparent recording sheet" used herein refers to a sheet used for a signboard to be placed in a railway station or other facilities which is illumined from rear with a light source such as a fluorescent light (back-light).

The PP sheet is highly useful when it is employed as a transparent recording sheet: it will easily receive a printable coating layer on its surface because it is easily amenable to printing and bonding, and thus printing based on an ink jet printer can be easily applied thereto; it is so transparent that it does not interfere with the illuminating effect of the back-light; it is so affinitive to the overlying printing coat and so transparent that contrast of printed images with the background is emphasized; and it readily amenable to direct printing such as offset printing, gravure printing, etc.

(4) Cosmetic Sheet (Film)

The PP sheet is highly useful when it is employed as a cosmetic sheet (film): it is so amenable to printing that it allows printing with common ink; it allows the coating layer to have antistatic activity so easily that sheet feed is improved and thus printing speed elevated; introduction of the coating layer having antistatic activity will dispense with the use of an antistatic agent for the substrate sheet which will lower the failure resulting from after-treatments (printing, bonding, etc.) which would be otherwise required to cope with adverse effects emerging according to the progression of seasons; and it is readily amenable to bonding based on an cyanoacrylate-based adhesive like ordinary resin sheets, that is, it readily receive the bonding of a piece of paper, wood or metal via a common adhesive agent.

(5) Emblem Sheet

"Emblem sheet" used herein refers to a sheet used for seal, label, sticker, etc.

The PP sheet is highly useful when it is employed as an emblem sheet: it is so amenable to printing that printing using an inexpensive common ink is possible; it is so amenable to bonding that it easily receives an adhesive layer; and it is so affinitive to the adhesive layer that it serves itself for various bonding applications.

The present embodiment having the features as described above will ensure following advantages.

(1) Because the sheet assembly is highly amenable to printing because of its incorporating polyalkylenimine, it allows printing based on common ink.

(2) Because the sheet assembly incorporates the coating material, which comprises polyethylenimine and a water-soluble acrylic resin blended at an appropriate ratio, it is protected against lowered adhesiveness, which would result if it incorporated only polyethylenimine.

(3) Because the coating layer has a thickness of 0.0075 μm, and the blending ratio of the water-soluble acrylic resin and polyethylenimine is 5:1 (0.125:0.025), the coating layer is highly affinitive to the substrate sheet so that the resulting sheets will hardly develop blocking even when overlaid to each other.

(4) Because the coating density of polyethylenimine is set at 0.0012 $g/m^2$, it is possible to maintain the improved printability of the PP sheet, and not to interfere with the adhesiveness of an cyanoacrylate adhesive agent even when it is put into contact with the adhesive agent.

(5) Because the PP sheet is supplemented with an antistatic agent based on sodium sulfonate at a concentration of 11.7 wt %, it is provided with antistatic activity, and thus it is protected against blocking which would occur if PP sheets with excess static electricity are overlaid to each other, and thus against impaired sheet feed which would be encountered with such sheets with excess statistic electricity. Moreover, addition of an antistatic agent to a coating material will effectively lessen the amount of an antistatic agent to be added to a PP sheet material which would be otherwise required, thereby preventing the bleed-out from the sheet of the agent which would result if the sheet containing an otherwise required amount of antistatic agent were exposed to high temperatures, that is, the bleed-out which would degrade the appearance of the sheet and its amenability to processing will be effectively avoided.

(6) Because polyethylenimine has a molecular weight of 1200, the resulting coat material will have a long pot life, and the coat therefrom will not form any problem including the one with regard to its transparency.

(7) Because the neutralizing agent is based on volatile 2-ethanolamine, the volatile neutralizing agent will not remain in the coating layer. Accordingly, it is possible to avoid the degradation of the coating layer, which would result if the neutralizer remained in the coating layer.

The various variants cited with respect to the first embodiment will be also deducible from the present embodiments.

EXAMPLES

Examples and comparative examples will be described below for further illustrating the present invention.

Examples 1 to 5 are based on the first and second embodiments while Comparative Examples 1 and 2 are given for comparison.

Example 6 is based on the third embodiment described above, and Comparative Example 3 is introduced so that the pot life is compared between the two.

Examples 7 to 9 are based on the third embodiment, while Comparative Examples 4 to 7 are given for comparison.

Example 1

A coating material was prepared by using following materials, and a PO sheet assembly having a coating layer was prepared by the method described with respect to the first embodiment. Then, the sheet assembly was applied to the first production system described with respect to the second embodiment with aluminum used as a non-iron metal for the metal film, to produce an ornamental sheet assembly.

The coating layer had a thickness of 0.0075 μm.

(1) Water-soluble acrylic resin: copolymer of acrylic acid and methacrylic acid esters.

(2) Polyalkylenimine: polyalkylenimine having a molecular weight of 1200.

(3) Antistatic agent: sodium sulfonate-based surfactant.

(4) Blending ratio of water-soluble acrylic resin to polyethylenimine: 0.125 ($g/m^2$)/0.025 ($g/m^2$)=5/1.

(5) Addition amount of antistatic agent: 11.7 wt %.

Example 2

Another ornamental sheet assembly was obtained by the same method as in Example 1 except that the coating density of polyethylenimine is set at 0.025 ($g/m^2$), and that the coating layer had a thickness of 0.03 μm.

Example 3

A still further ornamental sheet assembly was obtained by the same method as in Example 1 except that the coating density of polyethylenimine is set at 0.0625 ($g/m^2$), and that the coating layer had a thickness of 0.09 μm.

Example 4

A still further ornamental sheet assembly was obtained by the same method as in Example 1 except that the coating density of polyethylenimine is set at 0.0005 ($g/m^2$), and that the coating layer had a thickness of 0.007 μm.

Example 5

A still further ornamental sheet assembly was obtained by the same method as in Example 1 except that the coating density of polyethylenimine is set at 0.0125 ($g/m^2$), and that the coating layer had a thickness of 0.04 μm.

Comparative Example 1

An ornamental sheet assembly was obtained by the same method as in Example 1 except that no coating layer was formed on the substrate sheet.

Comparative Example 2

Another ornamental sheet assembly was obtained by the same method as in Example 1 except that no coating layer was formed on the substrate sheet, and that the adhesive agent is a urethane-based adhesive agent.

The ornamental sheet assemblies obtained in the above Examples and Comparative Examples were evaluated in terms of their transparency and affinity to the metal film (ornamental layer), and the results are listed in Table 1.

If a given test sheet assembly is found to be equal in transparency to the substrate sheet or the PO sheet, it is marked by "A". If the test sheet assembly is found to be inferior in transparency to the substrate or the PO sheet, it is marked by "C".

Adhesion of the ornamental layer to the substrate sheet was tested and evaluated as follows: a piece of cellophane tape was applied onto the surface of the ornamental layer; the tape was vigorously pulled apart from the surface in a direction orthogonal to the surface; and adhesion of the ornamental layer was evaluated. The evaluation result was marked as follows: "A" for a case where no ornamental layer is torn off; "B" for a case where a part of the ornamental layer is torn off; and "C" for a case where a large part of the ornamental layer is torn off.

It is seen from Table 1 that the ornamental sheet assemblies obtained in Examples 1 to 3 are excellent in transparency and adhesiveness because they comprise a coating layer on a substrate sheet, and include a hologram layer and the PO sheet bonded together with an acrylic adhesive agent.

In contrast, it is seen from the table that the ornamental sheet assembly obtained in Comparative Example 1 is impaired in its adhesiveness because it does not have sufficient adhesion to the adhesive layer of an acrylic resin adhesive agent which is accounted for by the lack of the coating layer.

It is also seen from the table that the ornamental sheet assembly obtained in Comparative Example 2 is impaired in transparency, though maintaining sufficient adhesiveness in spite of its lacking the coating layer, because it incorporates a urethane-based adhesive agent.

TABLE 1

|  | Coating layer | Transparency | Adhesiveness |
| --- | --- | --- | --- |
| Example 1 | Acrylic | A | A |
| Example 2 | Acrylic | A | A |
| Example 3 | Acrylic | A | A |
| Example 4 | Acrylic | A | B |
| Example 5 | Acrylic | A | B |
| Comparative Example 1 | Acrylic | A | C |
| Comparative Example 2 | Acrylic | C | B |

Example 6

A coating material was prepared from the following constituents, and its pot life was determined.

(1) Water-soluble acrylic resin: copolymer of acrylic acid and methacrylic acid esters.

(2) Polyalkylenimine: polyalkylenimine having a molecular weight of 600.

(3) Antistatic agent: sodium sulfonate-based surfactant.

(4) Blending ratio of water-soluble acrylic resin to polyethylenimine: 0.0125 $(g/m^2)/0.25$ $(g/m^2)$=5/1.

(5) Addition amount of antistatic agent: 11.7 wt %.

Comparative Example 5

A coating material was prepared from the same constituents blended at the same ratio as in Example 6 except that polyethylenimine has a molecular weight of 70,000.

The coating materials obtained in Example 6 and Comparative Example 3 were determined of their pot life, and the results are shown in Table 2.

It is seen from the table that the coating material of Example 6 which incorporates polyethylenimine having a molecular weight of 600 has a pot life over 8 hours, that is, the life is markedly prolonged as compared with the coating material of Comparative Example 3 which incorporates polyalkylenimine having a molecular weight of 70,000 and which has a pot life less than 2 hours.

TABLE 2

|  | Pot life |
| --- | --- |
| Example 6 | >8 |
| Comparative Example 3 | <2 |

Next, various coating materials were prepared with the blending ratio of the water-soluble acrylic resin and polyethylenimine varied, and what influence the coats prepared from those coating materials have on the PO sheet assembly was studied.

Example 7

A test coating material was applied on both surfaces of a PP sheet by the method described above with respect to the embodiments, to produce a PP sheet assembly with coating layers on both surfaces.

The coating material was prepared from the same constituents blended at the same ratio as in Example 6 except that polyethylenimine has a molecular weight of 1,200.

Example 8

A PP sheet assembly with coating layers on both surfaces was obtained as in Example 7 except that the blending ratio of the water-soluble acrylic resin and polyethylenimine was made 1:4 (0.125:0.5).

Example 9

A PP sheet assembly with coating layers on both surfaces was obtained as in Example 7 except that the blending ratio of the water-soluble acrylic resin and polyethylenimine was made 1:2 (0.625:1.25).

Comparative Example 4

A PP sheet (having received corona treatment) with no coating material coated thereupon was served for test.

Comparative Example 5

A PP sheet assembly with coating layers on both surfaces was obtained as in Example 7 except that the blending ratio of the water-soluble acrylic resin and polyethylenimine was made 12.5:1 (0.125:0.01).

Comparative Example 6

A PP sheet assembly with coating layers on both surfaces was obtained as in Example 7 except that the blending ratio of the water-soluble acrylic resin and polyethylenimine was made 25:1 (0.625:0.025).

Comparative Example 7

A PP sheet assembly with coating layers on both surfaces was obtained as in Example 7 except that the blending ratio of the water-soluble acrylic resin and polyethylenimine was made 1:10 (0.125:1.25).

The PP sheet assemblies obtained in Examples 7 to 9 and in Comparative Examples 4 and 5 were tested and evaluated for their transparency, resistance to blocking, easiness for cutting, printability (easiness for sheet feed, and affinity to ink), and adhesiveness (to cyanoacrylic adhesive agents and to wood), and the evaluation results are shown in Table 3. The table also lists the data regarding the thickness of the test sheet assemblies, and the coating density of polyethylenimine.

TABLE 3

| | Thickness of coating layer (μm) | Coating density of polyethyl-enimine (g/m²) | Transparency | Resistance to blocking | Easiness for cutting | Affinity to ink (UV offset) | Affinity to ink (general UV ink) | Adhesiveness to cyanoacrylate | Adhesiveness to wood |
|---|---|---|---|---|---|---|---|---|---|
| Example 7 | 0.0075 | 0.0012 | A | A | A | A | A | A | A |
| Example 8 | 0.03 | 0.025 | A | A | A | A | A | A | A |
| Example 9 | 0.09 | 0.0625 | A | A | A | A | A | A | A |
| Comparative Example 4 | — | — | A | A | A | C | C | A | C |
| Comparative Example 5 | 0.007 | 0.0005 | A | A | A | C | C | C | C |
| Comparative Example 6 | 0.04 | 0.0125 | A | A | A | C | C | C | C |
| Comparative Example 7 | 0.007 | 0.0625 | A | C | C | A | A | C | A |

The various properties cited in Table 3 of the test sheet assembly were determined and evaluated as follows.

(1) Transparency

The test sheet assembly was determined of its haze by a method based on JIS K-7105. If a test sheet assembly gave haze of 3.0% or less, it was judged satisfactory ("A").

(2) Resistance to Blocking (Anti-blocking Property)

PP sheet assemblies (0.3 t) were laid one over another until the heap reached a height of 1.5 m, and the heap was left for 24 hours, and evaluated as follows according to the presence of blocking.

If all sheet assemblies did not change in appearance, and they were easily separated from each other, the sheet assembly was judged satisfactory ("A").

If all sheet assemblies did not change in appearance, and they were separated from each other without forming any practical problem, although slight blocking was observed, the sheet assembly was judged fair ("B").

If some sheet assemblies changed in appearance, and could not be separated from each other as a result of blocking, the sheet assembly was judged inadequate ("C").

(3) Easiness for Cutting

Sheet assemblies were cut into pieces with a cutter, and pieces from different sheet assemblies were laid one over another, and the heap was checked for the presence of blocking. The evaluation standard was the same as in the section (2).

(4) Printability (4-1) Easiness for Sheet Feed

A heap of sheet assemblies were prepared, and they were checked whether they could be smoothly fed to a UV offset printing machine at a rate of 8000 sheets/hour. If they were found to be smoothly fed, their easiness for sheet feed was judged satisfactory ("A"). If they could not be smoothly fed, their easiness for sheet feed was judged inadequate ("C").

(4-2) Affinity to Ink

A piece of cellophane tape was applied to a printed surface of a sheet assembly, and the tape was vigorously pulled apart from the surface in a direction orthogonal to the surface, and the affinity of the sheet assembly to ink was evaluated as follows.

If the printed ink did not separate, the affinity of the sheet assembly to ink was judged satisfactory ("A").

If a part of the printed ink separated, the affinity of the sheet assembly to ink was judged fair ("B").

If a large part of the printed ink separated, the affinity of the sheet assembly to ink was judged inadequate ("C").

(5) Adhesiveness (5-1) Adhesiveness to Cyanoacrylate

Two PP sheet assemblies were prepared; one had a cyanoacrylate adhesive agent applied on one surface after the application of a primer; and the other was applied to the coated surface of the former for adhesion. The two bonded sheet assemblies were mechanically separated, and the adhesiveness of the sheet assembly to cyanoacrylate was evaluated according to the exertion required for the separation.

If the force required for separation is sufficient for breaking the sheet assembly itself, the adhesiveness of the sheet assembly to cyanoacrylate was judged satisfactory ("A").

If the force required for separation is below the level at which the sheet assembly itself would break, the adhesiveness of the sheet assembly to cyanoacrylate was judged inadequate ("C").

(5-2) Adhesiveness to Wood

A wood slab is bonded via a wood adhesive agent in the form of a resin emulsion to a sheet assembly, and the adhesiveness of the sheet assembly to wood was evaluated according to the following standard.

If a force of 9.8 N/1.5 cm or higher is required for separating the wood from the sheet assembly, the adhesiveness of the sheet assembly to wood was judged satisfactory ("A").

If a force less than 9.8 N/1.5 cm is required for separating the wood from the sheet assembly, the adhesiveness of the sheet assembly to wood was judged inadequate ("C").

It is seen from Table 3 that the sheet assemblies of Examples 7 to 9 are far more excellent in the affinity to ink and adhesiveness to cyanoacrylate and to wood than corresponding Comparative Examples, because the former includes the water-soluble acryl resin and polyethylenimine at a ratio in the range of 5:1 to 1:4. It is also seen from the table that the sheet assemblies of the Examples are more excellent in transparency, resistance to blocking and easiness for cutting than the corresponding Comparative Examples, and that the former is more excellent in easiness for sheet feed than the latter because the former receives the addition of a specific amount of an antistatic agent.

On the other hand, because Comparative Example 4 is a neat PP sheet with no coating layer applied, it incorporates no polyethylenimine, and thus its adhesiveness to cyanoacrylate is excellent. However, its adhesiveness to wood is low and its affinity to ink is also low.

The sheet assemblies of Comparative Examples 5 and 6 incorporate the water-soluble acrylic resin and polyethylenimine at ratios of 12.5:1 and 25:1, respectively. The fraction of polyethylenimine is considerably low when compared with the value of corresponding Examples, which may account for the low affinity to ink of the sheet assemblies of the Comparative Examples here concerned.

The sheet assembly of Comparative Example 7 incorporates the water-soluble acrylic resin and polyethylenimine at a ratio of 1:10 which indicates the fraction of polyethylenimine is considerably higher than in the corresponding Examples. This may account for the fact that the sheet assembly in question is low in adhesiveness and tends to develop blocking although its affinity to ink is improved.

INDUSTRIAL AVAILABILITY

The sheet assembly of the present invention is applicable as a polyolefin-based sheet for packing, or more specifically is utilizable as a display sheet, package sheet, transparent recording sheet, cosmetic sheet, and emblem sheet, and a coating material to be used for the formation of a coating layer on the above sheet.

What is claimed is:

1. A polyolefin-based sheet comprising a coating layer, said coating layer comprising a coating material comprising a water-soluble acrylic resin and a polyalkylenimine, wherein said water-soluble acrylic resin comprises an unsaturated carboxylic acid.

2. A polyolefin-based sheet as described in claim 1 wherein said coating layer has a thickness of 0.003 to 0.1 $\mu$m, and said water-soluble alkyl resin and said polyalkylenimine are blended in a ratio in the range of 5:1 to 1:4.

3. A polyolefin-based sheet as described in claim 2 wherein said coating layer comprises said polyalkylenimine in an amount in the range of 0.0005 to 0.1 $g/m^2$.

4. A polyolefin-based sheet as described in claim 1 wherein said coating layer comprises an antistatic agent in an amount of 0.5 to 30 wt % with respect to the overall weight of solid components of said coating material.

5. A polyolefin-based sheet as described in claim 1 wherein said coating layer further comprises at least one member selected from the group consisting of a natural organic material powder, an ultra-violet ray absorbing agent, and mixtures thereof.

6. A polyolefin-based sheet as described in claim 1 wherein said polyolefin-based sheet is a polypropylene-based sheet.

7. A display sheet comprising a polyolefin-based sheet as described in claim 1.

8. A package sheet comprising a polyolefin-based sheet as described in claim 1.

9. A transparent recording sheet comprising a polyolefin-based sheet as described in claim 1.

10. A cosmetic sheet comprising a polyolefin-based sheet as described in claim 1.

11. An emblem sheet comprising a polyolefin-based sheet as described in claim 1.

12. A polyolefin-based sheet as described in claim 1 comprising a polyolefin-based substrate sheet which will have a metal-containing ornamental layer formed at least on one of its surfaces, and a coating layer on the surface upon which the ornamental layer will be formed, wherein the coating layer comprises a coating material comprising a water-soluble acrylic resin prepared from a polymer of an unsaturated carboxylic acid, and polyalkylenimine.

13. A polyolefin-based sheet as described in claim 12 wherein said unsaturated carboxylic acid is selected from the group consisting of acrylic acid, methacrylic acid, and mixtures thereof.

14. A polyolefin-based sheet as described in claim 12 wherein said ornamental layer is a hologram layer.

15. An ornamental sheet comprising:

a polyolefin-based substrate sheet having a coating layer comprising a coating material comprising a water-soluble acrylic resin and a polyalkylenimine;
an acrylic adhesive layer formed on said coating layer; and
an ornamental layer formed on said acrylic adhesive layer.

16. An ornamental sheet as described in claim 15 wherein said ornamental sheet comprises a metal.

17. An ornamental sheet as described in claim 15 wherein said ornamental layer is a hologram layer.

18. An ornamental sheet as described in claim 15 wherein the thickness of said coating layer is 0.003 to 0.1 $\mu$m, and said water-soluble acrylic resin and said polyalkylenimine are blended in a ratio of 5:1 to 1:4.

19. An ornamental sheet as described in claim 15 wherein said coating layer comprises said polyalkylenimine in an amount of 0.0005 to 0.1 $g/m^2$.

20. An ornamental sheet as described in claim 15 wherein said coating layer comprises an antistatic agent in an amount of 0.5 to 30 wt % in terms of its weight against the overall weight of solid components of said coating material.

21. An ornamental sheet as described in claim 15 wherein said coating layer comprises at least one member selected from the group consisting of a natural organic material powder, an ultra-violet ray absorbing agent, and mixtures thereof.

22. An ornamental sheet as described in claim 15 wherein said polyolefin-based substrate sheet is a polypropylene-based sheet.

23. An ornamental sheet as described in claim 15 wherein the total haze of said polyolefin-based substrate sheet is 10% or less.

24. A coating material for polyolefin-based resins comprising a water-soluble acrylic resin comprising a polymer of an unsaturated carboxylic acid, and polyalkylenimine.

25. A coating material for polyolefin-based resins as described in claim 24 wherein said unsaturated carboxylic acid is selected from the group consisting of acrylic acid, methacrylic acid, and mixtures thereof.

26. A coating material for polyolefin-based resins as described in claim 24 further comprising volatile amine as an agent for neutralizing said carboxylic group of the water-soluble acrylic acid.

27. A coating material for polyolefin-based resins as described in claim 24 wherein the molecular weight of said polyalkylenimine is 200 to 20000.

28. A coating material for polyolefin-based resins as described in claim 24 wherein said polyalkylenimine is polyethylenimine.

29. A coating material for polyolefin-based resins as described in claim 24 wherein said water-soluble acrylic resin and said polyethylenimine are blended in a ratio of 5:1 to 1:4.

30. A coating material for polyolefin-based resins as described in claim 24 further comprising an antistatic agent.

31. A coating material for polyolefin-based resins as described in claim 30 wherein said coating material comprises said antistatic agent in an amount of 0.5 to 30 wt % with respect to the overall weight of solid components of said coating material.

32. A coating material for polyolefin-based resins as described in claim 24 wherein said coating material comprises at least one member selected from the group consisting of a natural organic material powder, a solubilized natural organic material powder, and mixtures thereof.

33. A coating material for polyolefin-based resins as described in claim 24 further comprising an ultra-violet ray absorbing agent.

* * * * *